United States Patent
Durette et al.

(10) Patent No.: US 11,559,842 B2
(45) Date of Patent: Jan. 24, 2023

(54) CUTTING DEVICE

(71) Applicant: Smart Skin Technologies Inc., Fredericton (CA)

(72) Inventors: Shawn Maurice Dale Durette, Yoho (CA); Patrick Hachey, Nigadoo (CA); Laurie Duguay, Duguayville (CA); Roua M. Razak, Mississauga (CA)

(73) Assignee: Smart Skin Technologies Inc., Fredericton (CA)

( * ) Notice: Subject to any disclaimer, the term of this patent is extended or adjusted under 35 U.S.C. 154(b) by 0 days.

(21) Appl. No.: 16/986,999

(22) Filed: Aug. 6, 2020

(65) Prior Publication Data

US 2022/0040771 A1    Feb. 10, 2022

(51) Int. Cl.
| | | |
|---|---|---|
| *B23D 21/00* | (2006.01) | |
| *B23D 33/04* | (2006.01) | |
| *B67B 7/00* | (2006.01) | |
| *B23D 35/00* | (2006.01) | |

(52) U.S. Cl.
CPC ............. *B23D 21/00* (2013.01); *B23D 33/04* (2013.01); *B67B 7/38* (2013.01); *B23D 35/001* (2013.01); *B23D 35/005* (2013.01)

(58) Field of Classification Search
CPC .......... B26D 7/18; B26D 5/005; B26D 3/166; B26D 3/16; B26D 1/16; B26D 3/003; B23Q 16/001; B23B 31/1175; B23B 5/00; B29D 99/0082; B29B 17/0206; A61F 2/4465;

(Continued)

(56) References Cited

U.S. PATENT DOCUMENTS 3,073,193 A * 1/1963 Grant ................... B27B 17/0016
                                                      82/117
3,481,234 A * 12/1969 Luce, Sr. ................. B26D 3/16
                                                       82/85

(Continued)

FOREIGN PATENT DOCUMENTS

| CN | 204365779 U | 6/2015 |
|---|---|---|
| KR | 200431035 Y1 | 11/2006 |

OTHER PUBLICATIONS

International Search Report and Written Opinion dated Oct. 29, 2021 in related International Patent Application No. PCT/CA2021/051016 (7 pages).

*Primary Examiner* — Ghassem Alie
(74) *Attorney, Agent, or Firm* — BERESKIN & PARR LLP/ S.E.N.C.R.L., s.r.l.

(57) ABSTRACT

A can cutting device that has a main body and a can support assembly coupled to the main body. The can support assembly has a shaft that extends along a longitudinal shaft axis, an eccentrically mounted mandrel that extends along a longitudinal mandrel axis parallel to the longitudinal shaft axis, and a cutter coupled to the main body having a cutting surface. The can is positionable in a mounted position such that the can is rotatable about a can axis of rotation, the cutting surface is positional to contact the portion of the can body supported by the mandrel at the cutting location, and when the cutting surface is in contact with the portion of the can body supported by the mandrel at the cutting location and the can is rotated about the can axis of rotation, the cutter cuts the portion of the can body at the cutting location.

23 Claims, 10 Drawing Sheets

(58) Field of Classification Search
CPC ............. B21D 19/005; Y10T 82/16967; Y10T 82/16688; Y10T 82/16016; Y10T 82/20
USPC ............ 83/81; 82/101, 58, 85, 110, 117, 48, 82/102, 47, 49, 86, 96, 89, 92, 168, 12, 9; 74/84, 105, 94, 106
See application file for complete search history.

(56) References Cited

U.S. PATENT DOCUMENTS

| | | | | |
|---|---|---|---|---|
| 3,748,934 | A | * | 7/1973 | Lezberg .................. B26D 3/16 82/48 |
| 3,838,653 | A | | 10/1974 | Larkin et al. |
| 3,960,099 | A | | 6/1976 | Dobias et al. |
| 3,994,251 | A | | 11/1976 | Hake et al. |
| 4,649,780 | A | * | 3/1987 | Takeuchi ................ B26D 3/06 82/48 |
| 4,781,047 | A | * | 11/1988 | Bressan ................. B65D 1/165 72/84 |
| 5,555,783 | A | * | 9/1996 | Pienta ................... B23D 21/00 82/101 |
| 7,347,130 | B2 | * | 3/2008 | Pham ................... A61F 2/4465 82/101 |
| 9,120,588 | B2 | | 9/2015 | Deckert et al. |

\* cited by examiner

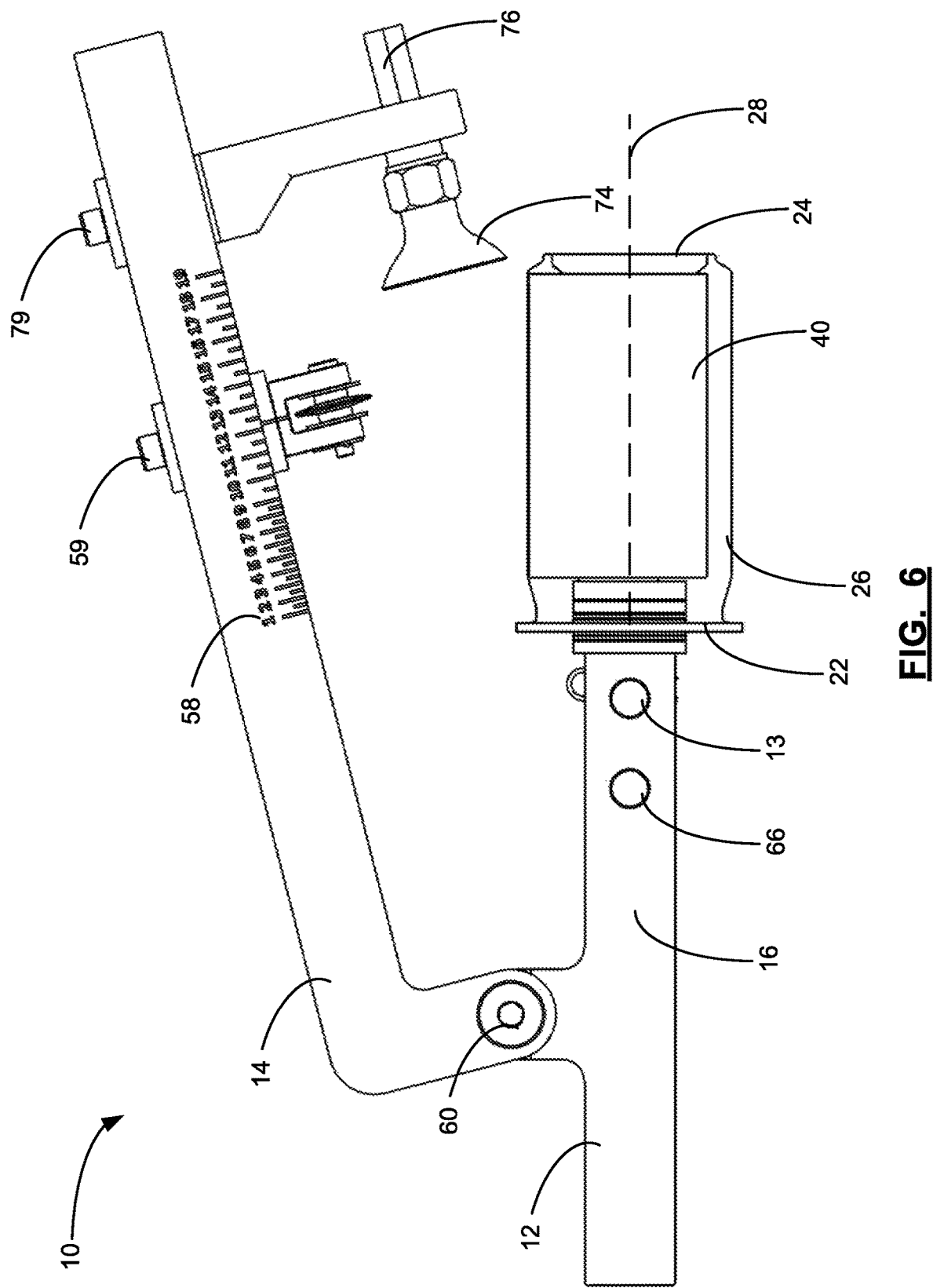

CUTTING DEVICE

FIELD

The described embodiments relate generally to cutting devices, and, more particularly, to cutting devices for cylindrical containers.

BACKGROUND

The following is not an admission that anything discussed below is part of the prior art or part of the common general knowledge of a person skilled in the art.

Various applications require containers to be cut to precise sizes. For instance, cylindrical containers such as cans may need to be cut to specific sizes to permit or facilitate various manufacturing or testing processes. Various different types of devices may be used to cut cans, depending on the specific application required. For example, a typical can opener may remove the top portion of a can using a serrated cutter to rotate around the top of the can until the surface has been cut through.

Conventional cans (e.g. aluminum cans that may be used as beverage containers) often have thin walls. These cans are often difficult to cut due to the thin walls and cylindrical shape. Traditional can openers are often designed to apply a significant amount of force to the top surface of a can which may result in buckling of the can walls.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, which may be used alone or in combination with any other aspect, there is a provided a can cutting device for cutting cans. The can cutting device includes a mandrel that is eccentrically mounted to a shaft. The mandrel is used to receive the can body and provide support during the cutting process. The eccentrically mounted mandrel may provide the advantage of allowing the can to be easily mounted while maintaining a stable can axis of rotation.

In accordance with this broad aspect, there is provided a can cutting device for a can having an open end, a base end, and a can body extending between the open end and the base end, the can cutting device comprising: a main body; a can support assembly coupled to the main body, the can support assembly having a shaft that extends along a longitudinal shaft axis and a mandrel that extends along a longitudinal mandrel axis parallel to the longitudinal shaft axis, wherein the mandrel is eccentrically mounted to the shaft; and a cutter coupled to the main body, the cutter having a cutting surface; wherein the can is positionable in a mounted position on the mandrel with the can mounted in a position that holds the can body in contact with the mandrel at least at a cutting location, when the can is positioned in the mounted position: the can is rotatable about a can axis of rotation, the cutting surface is positionable to contact the portion of the can body supported by the mandrel at the cutting location, and when the cutting surface is in contact with the portion of the can body supported by the mandrel at the cutting location and the can is rotated about the can axis of rotation, the cutting surface cuts the portion of the can body at the cutting location.

In any embodiment, the can cutting device may further include: an adjustment mechanism usable to adjust the can cutting device between a cutting position and a loading position, where when the can cutting device is in the loading position, the can may be removably positionable in the mounted position on the mandrel, and when the cutting device is in the cutting position and the can is positioned in the mounted position: the cutting surface may contact the portion of the can body supported by the mandrel at a cutting location, and when the can is rotated about the can axis of rotation, the cutting surface may cut the portion of the can body at the cutting location.

In any embodiment, the can cutting device may further include: a spindle rotatably coupled to the main body, the spindle may be rotatable about a spindle axis of rotation, an attachment member coupled to the spindle, the attachment member may be engageable with the can; and a spindle drive coupled to the spindle, the spindle drive may be operable to drive rotation of the spindle.

In any embodiment, when cutting device is in the cutting position and the can is positioned in the mounted position the attachment member may be drivingly engaged with the can such that rotation of the spindle may drive rotation of the can body.

In any embodiment, the mandrel may be rotatably mounted to the shaft such that the can and the mandrel may be concurrently rotatable.

In any embodiment, the main body may include a top frame portion and a bottom frame portion, and the adjustment mechanism may include a pivotable mount between the top frame portion and the bottom frame portion, where the pivotable mount may be operable to rotate the top frame portion to adjust the can cutting device between the cutting position and the loading position.

In any embodiment, the cutting device may further include a pressure adjuster, the pressure adjuster may be operable to adjust a pressure of the cutting surface against the can body.

In any embodiment, a pressure of the cutting surface against the can body may be less than 5 lbs.

In any embodiment, the cutting device may further include an adjustment lock movable between a locked position and an unlocked position, where when the adjustment lock is in the locked position the pivotable mount is fixed to secure the can cutting device in one of the loading position and the cutting position and when the adjustment lock is in the unlocked position the pivotable mount may be operable to adjust the can cutting device between the cutting position and the loading position.

In any embodiment, the cutter may be adjustable between a cutter engaged position and a cutter disengaged position; the spindle may be adjustable between a spindle engaged position and a spindle disengaged position; and the adjustment mechanism may include a cutter adjuster operable to adjust the cutter between the cutter engaged position and a cutter disengaged position and a spindle adjuster operable to adjust the spindle between the spindle engaged position and the spindle disengaged position, where when the cutting device is in the cutting position the adjustable cutter may be positioned in the cutter engaged position and the adjustable spindle may be in the spindle engaged position such that the cutter and spindle are both in contact with the can, and when the cutting device is in the loading position the adjustable cutter may be in the cutter disengaged position and adjustable spindle may be in the spindle disengaged position such that the cutter and spindle are both disengaged from the can thereby facilitating removal of the can from the mandrel.

In any embodiment, the cutting device may further include a guide plate rotatably mounted to the shaft, where when the cutting device is in the cutting position the guide plate may support the open end of the can whereby rotation of the can may drive rotation of the guide plate about the can axis of rotation.

In any embodiment, the attachment member may include a biasing member to bias the can body against the guide plate.

In any embodiment, the biasing member may bias the can body against the guide plate with a pressure such that as the can is rotated about the can axis of rotation the cutting location may remain at a constant distance from the guide plate.

In any embodiment, the pressure provided by the biasing member to bias the can body against the guide plate may be less than 2 lbs.

In any embodiment, the attachment member may include a vacuum cup.

In any embodiment, the cutter may be movable along a cutter axis parallel to the mandrel longitudinal axis such that the cutting location may be adjustable.

In any embodiment, the cutting device may further include a length guide along the cutter axis.

In any embodiment, at least one of the shaft and the mandrel may be removable.

In any embodiment, the cutting device may further include a shaft adaptor coupled to the main body, where the shaft adaptor may removably couple the shaft to the main body.

In any embodiment, the spindle drive may include a manually actuated drive member.

In any embodiment, the mandrel may have a mandrel hardness value greater than a cutter hardness value of the cutter.

In any embodiment, the mandrel hardness value may be in the range of 53-57 HRC.

In accordance with another aspect of this disclosure, which may be used alone or in combination with any other aspect, there is provided a can cutting device having a spindle with a spindle drive, a shaft, and a mandrel eccentrically mounted to the shaft. The spindle has an axis of rotation that is aligned with a can axis of rotation. The eccentrically mounted mandrel may provide the advantage of allowing the can body to be easily mounted to the mandrel while aligning the can axis of rotation with the spindle axis of rotation. Aligning the axes of rotation may reduce the stress on the can cutting device and may improve the consistency of the cut in the can body.

In accordance with this aspect, there is provided a can cutting device for a can having an open end, a base end, and a can body extending between the open end and the base end, the can cutting device comprising: a main body; a can support assembly coupled to the main body, the can support assembly having a shaft that extends along a longitudinal shaft axis and a mandrel that extends along a longitudinal mandrel axis parallel to the longitudinal shaft axis, wherein the mandrel is eccentrically mounted to the shaft; a cutter coupled to the main body, the cutter having a cutting surface; a spindle rotatably coupled to the main body, wherein the spindle is rotatable about a spindle axis of rotation, and the spindle has an attachment member; and a spindle drive coupled to the spindle, the spindle drive operable to drive rotation of the spindle; wherein when the can is in a mounted position on the mandrel with the can mounted to the mandrel with at least a portion of the can body supported by the mandrel, the can is rotatable about a can axis of rotation, the cutting surface is positioned to contact the portion of the can body supported by the mandrel at a cutting location, the can axis of rotation and the spindle axis of rotation are aligned, and the attachment member is drivingly engaged with the base end of the can such that rotation of the spindle drives rotation of the can body whereby the cutting surface cuts the portion of the can body at the cutting location.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 6 shows a side view of the can cutter of FIG. 1 in a loading position with the can mounted to the can cutter;

Figure 1:
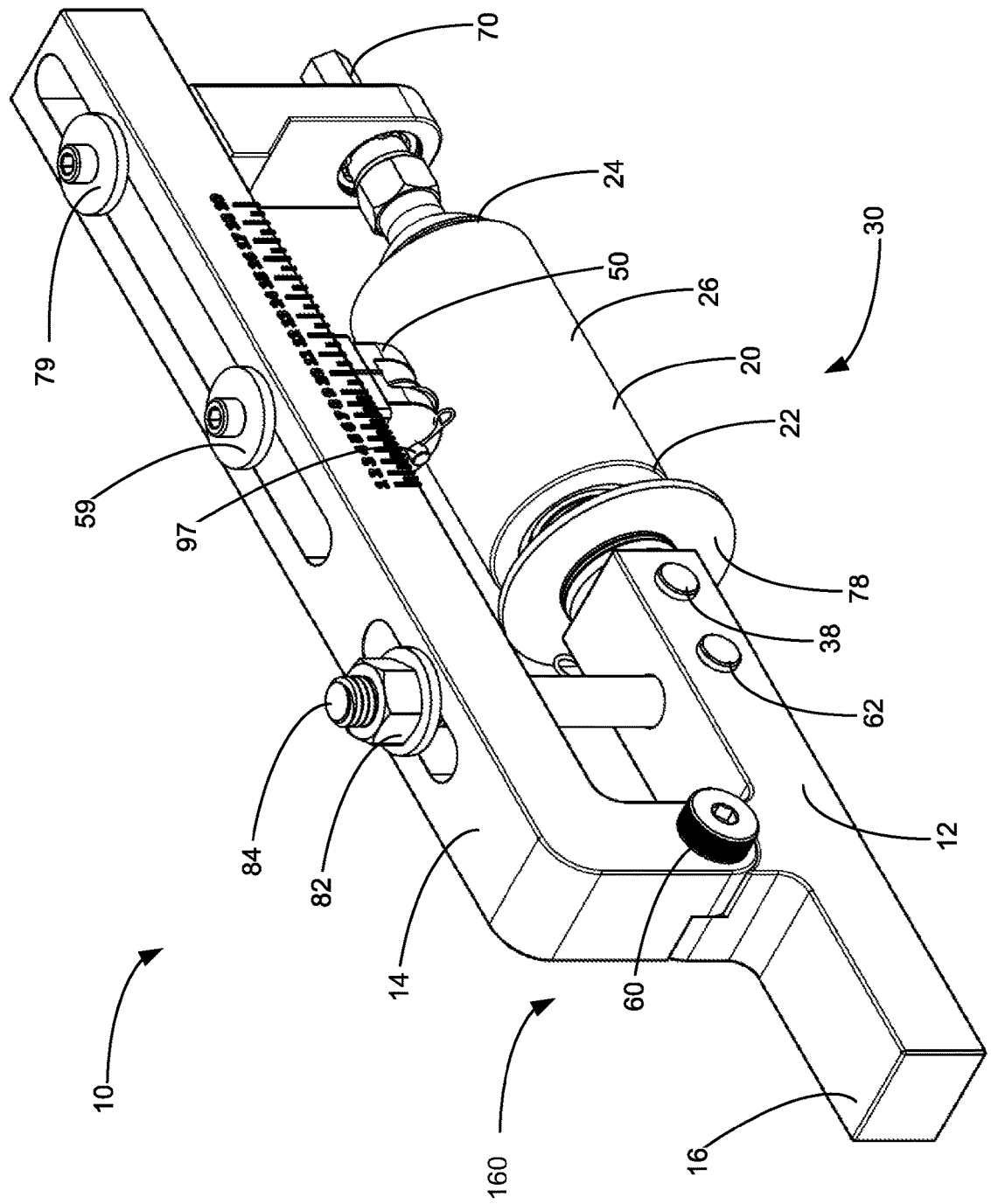
FIG. 1 shows a perspective view of a can cutter in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Referring to FIG. 1, shown therein is an exemplary embodiment of a can cutting device 10, also referred to as a cutting device 10. The can cutting device 10 may be used to cut a can 20. As exemplified in FIG. 1, the can 20 has an open end 22, a base end 24, and a can body 26 extending between the open end 22 and the base end 24.

Cutting device 10 may be used to cut the circumference of the can 20 to shorten its longitudinal length. Cutting device 10 may be configured to provide the can 20 with a clean cut opening.

As exemplified, can 20 is unseamed. Unseamed can 20 thus has an open end 22 that allow the can 20 to be mounted on the can cutting device 10. While the exemplified can 20 is a traditional aluminum beverage can, it will be appreciated that the can cutting device 10 may be used to cut any type, size, and material of can having an open end, such as the open end 22 of can 20.

As illustrated, can cutting device 10 has a main body 12 and a can support assembly 30 coupled to the main body 12. The can support assembly 30 includes a shaft 32 extending along a longitudinal shaft axis 33. The can support assembly 30 also includes a mandrel 40 that extends along a longitudinal mandrel axis 41.

The mandrel 40 can provide a support surface for the can 20 to be cut on. The mandrel 40 can prevent the can 20 from collapsing during the cutting process. As exemplified, the diameter of the mandrel 40 is smaller than the diameter of the can 20, thereby allowing the can 20 to be easily mounted on the mandrel 40.

Figure 10A:
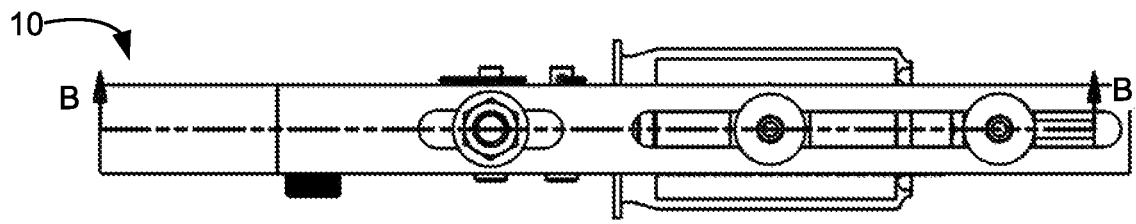
FIG. 10A shows a top view of the can cutter of FIG. 1.
Figure 10B:
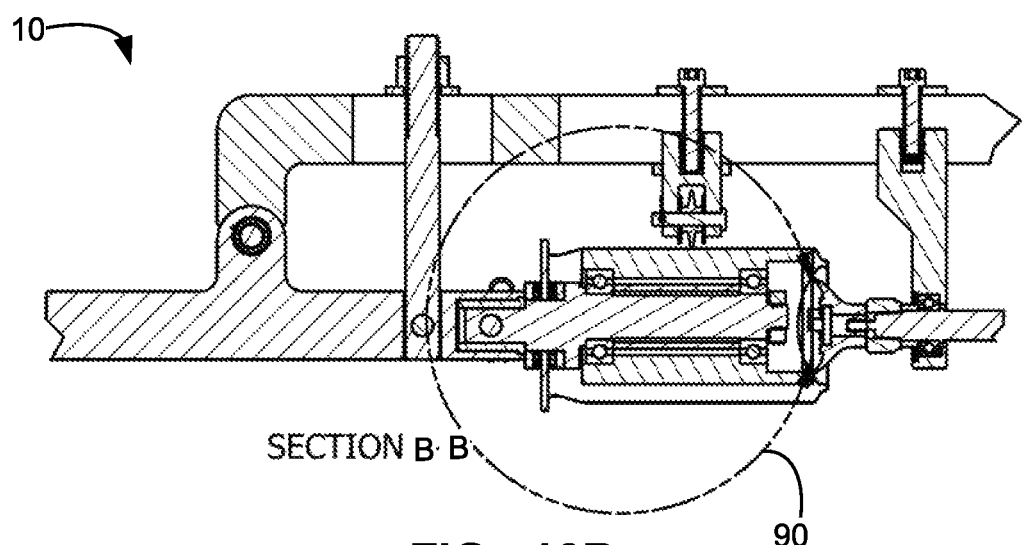
FIG. 10B shows a cross-sectional view of the can cutter of FIG. 10A, along the line B-B.
Figure 10C:
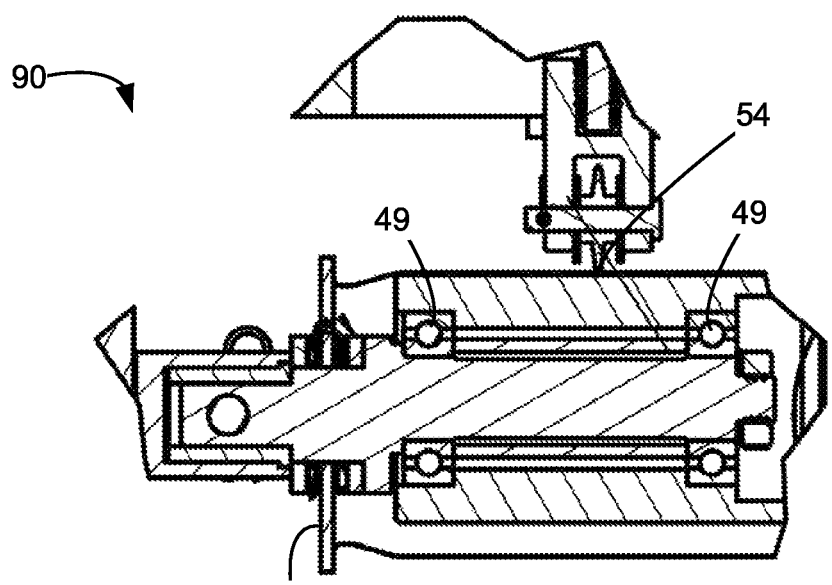
FIG. 10C shows an enlarged portion section B-B of the can cutter of FIG. 10B.

In some embodiments, shaft 32 may be fixed to main body 12. Alternately, the shaft 32 may be removable from the main body 12. As exemplified in FIGS. 7 and 10, the cutting device 10 may include a shaft adaptor 34 coupled to the main body 12. Shaft adaptor 34 may be operable to removably couple the shaft 32 to the main body 12. This may allow a user to repair and/or replace shaft 32. For example, shaft adaptor 34 may allow a user to remove and replace the shaft 32 with a differently sized shaft 32. Shaft adaptor 34 may also allow a user to replace the shaft 32 when shaft 32 becomes word and/or damaged through use.

Shaft adaptor 34 may be constructed to reduce stress on the main body 12 during a can cutting process. Shaft adaptor 34 may be manufactured using a stronger material than the rest of the main body 12. This may allow the shaft adaptor 34 to absorb a greater portion of the stress caused by the can cutting process as compared to the remainder of main body 12. For example, in some embodiments, the main body 12 may be made of a wood and/or plastic material, while the shaft adaptor 34 may be made of a metal material and/or a firmer plastic material.

The shaft 32 can include a shaft mounting element that is mateable with a corresponding adapter mounting element provided by shaft adaptor 34. The shaft 32 can be detachably mounted to the shaft adaptor 34 by mating the corresponding shaft mounting element and adaptor mounting element.

In the example illustrated, the shaft mounting element is provided in the form of a recess, in this case a shaft aperture 36, and the adaptor mounting element is provided in the form of a protruding member, in this case a pin 38. The protruding member (pin 38) may be receivable in the shaft aperture 36.

The main body 12 can also include an adaptor receiving member. The adaptor receiving member can be configured to mate with the shaft adaptor 34 to secure the shaft adaptor 34, and in turn the shaft 32, to the main body 12. For example, main body 12 can include a main body aperture 13. Main body aperture 13 can be shaped to receive the adaptor mounting element, in this case pin 38.

To mount the shaft 32 to the main body 12, the protruding member 38 can be received in the main body aperture 13 and the shaft aperture 36 concurrently. As illustrated, the protruding member 38 may extend through the main body aperture 13 and then to, and through, the shaft aperture 36. The adaptor mounting element 38 can thus provide a detachable mount for the shaft 32.

To detach the shaft 32 from main body 12, a user may remove the pin 38 from the main body aperture 13 and the shaft aperture 36. The shaft 32 may then be removed. Shaft 32 may subsequently be re-attached and/or replaced with a different shaft 32 by inserting the pin 38 into the shaft aperture 36 and the main body aperture 13. For example, a first shaft may be used for cans having a first range of volumes (e.g. 330 mL and 355 mL cans), while a smaller second shaft may be used for cans having a second, lower range of volumes (e.g. 220 mL cans). The shaft adaptor 34 can allow the shaft 32 to be easily replaced based on the can parameters of the can being cut.

Figure 8A:
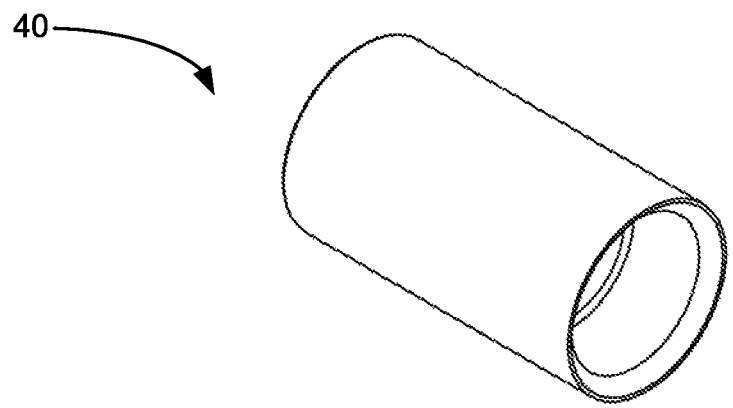
FIG. 8A shows a perspective view of a mandrel of the can cutter of FIG. 1.
Figure 8B:
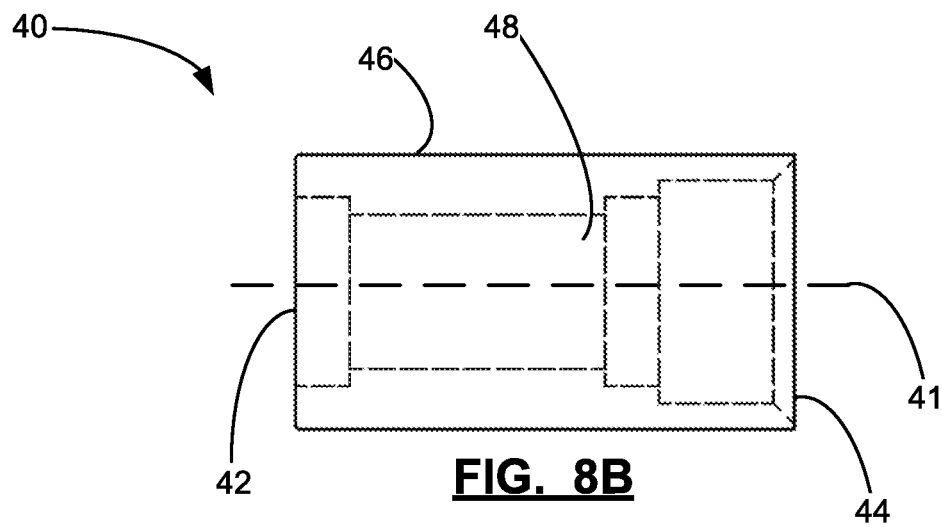
FIGS. 8B and 8C show a cross-sectional and front view, respectively, of the mandrel of FIG. 8A.
Figure 8C:
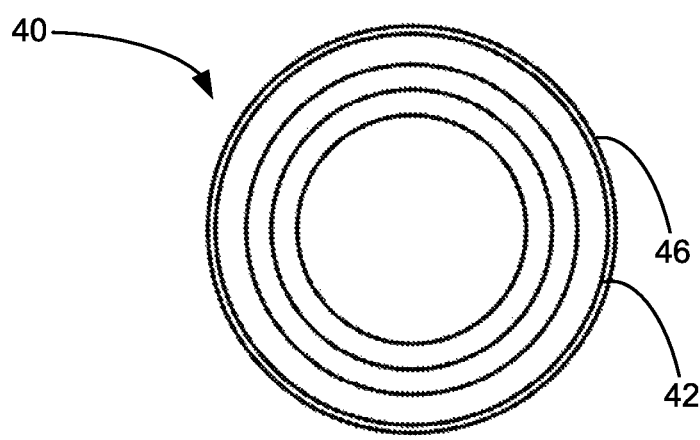
Figure 9A:
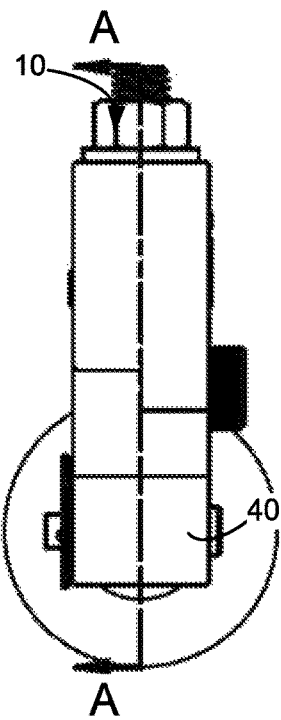
FIG. 9A shows a front view of the can cutter of FIG. 1.
Figure 9B:
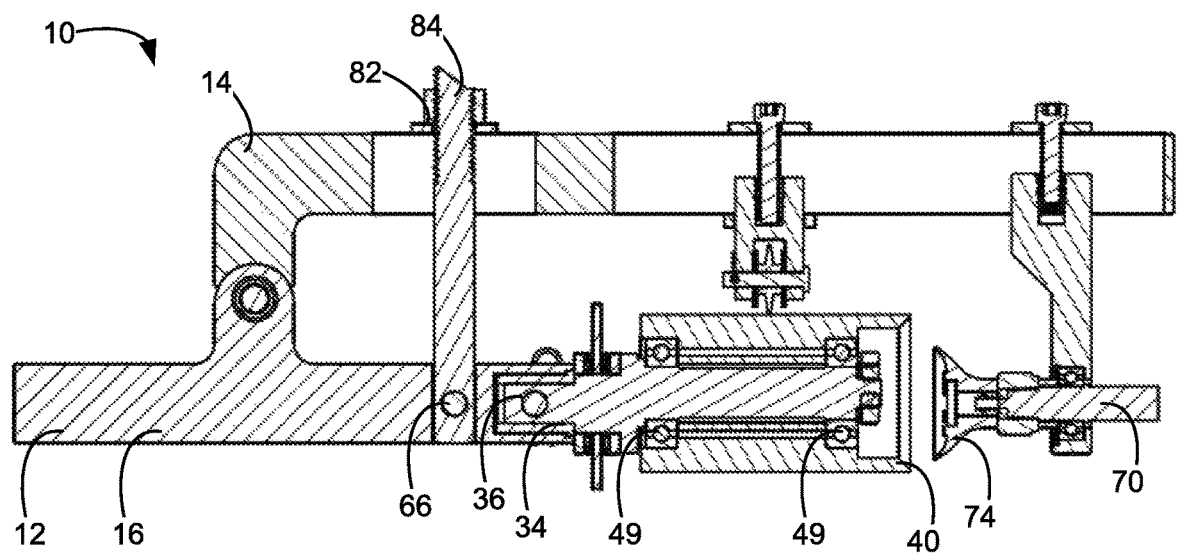
FIG. 9B shows a cross-sectional view of the can cutter of FIG. 9A, along the line A-A.

As exemplified in FIG. 8, the mandrel 40 has a first end 42, a second end 44, and a mandrel body 46 extending therebetween. In some embodiments, the mandrel 40 may be removable from the main body 12. Alternately, mandrel 40 may be fixed to main body 12.

In the example illustrated, the mandrel 40 may be removably received by the shaft 32. A user may remove the mandrel 40 from the shaft 32, e.g. for storage, maintenance and/or replacement. In some cases, mandrel 40 may be replaced by a different size and/or shape of mandrel to accommodate cans 20 with different lengths, diameters, or neck diameter openings. For example, different mandrels 40 may be used with differently sized cans, such as a different mandrel for each of 355 mL, 300 mL, and 330 mL cans. Alternately or in addition, a single mandrel 40 may be used for a plurality of can sizes.

The can cutting device 10 has a cutter 50. The cutter 50 is used to provide a cutting surface 52 usable to cut the can 20. The cutter 50 can be positioned to cut can at a cutting location 54. The can 20 is positionable in a mounted position on the mandrel 40. When the can 20 is positioned in the mounted position on the mandrel 40, the can 20 may be rotatable about a can axis of rotation 28. During operation, the cutting surface 52 may be positioned to contact the portion of the can body 26 supported by the mandrel 40 at the cutting location 54. The can 20 is rotated about the can axis of rotation 28 such that the cutting surface 52 cuts the portion of the can body 26 at the cutting location 54. In the mounted position, the can 20 can be mounted in a position that holds the can body 26 in contact with the mandrel 40 at least at the cutting location 54. This may help prevent buckling of the can 20 during the cutting process.

It will be appreciated that cans 20 when cut may be used in a variety of applications. Depending on the particular application, the desired length of the can 20 after being cut may vary. In some embodiments, the cutter 50 may be movable to allow the cutting location 54 to be adjusted. This may allow a user to select a desired length of can 20 to be cut.

For example, cutter 50 may be movable along a cutter axis 56. Cutter axis 56 can be aligned parallel to the longitudinal mandrel axis 41. Moving the cutter 50 along cutter axis can allow the cutting location 54 to be shifted longitudinally along the length of can 20.

In some examples, cutting device 10 may include a cutter lock 59. Cutter lock 59 may be used to secure the cutter 50 in place on the main body 12. The cutter lock 59 may be adjustable between an unlocked position and a locked position. In the locked position, cutter lock 59 can secure cutter 50 in place on the main body 12. In the unlocked position, cutter 50 may be movable relative to main body 12.

In some embodiments, the cutter lock 59 may be a clamp. During use, a user may unlock the clamp 59 and slide the cutter 50 along the cutter axis 56 to change the cutting location 54. The user may then lock the cutter 50 in place by adjusting the cutter lock 59 to the locked position. As exemplified in FIGS. 1, 2, 5, and 6, the cutting device 10 may include a length guide 58 along the cutter axis 56. During operation, a user may move the cutter 50 along the cutter axis 56 to change the cutting length of the can 20. The user may use the length guide 58 to identify the desired cutting location 54 on the can body 26. The cutter 50 can be aligned using the length guide 58 to provide the desired cutting location.

Figure 2:
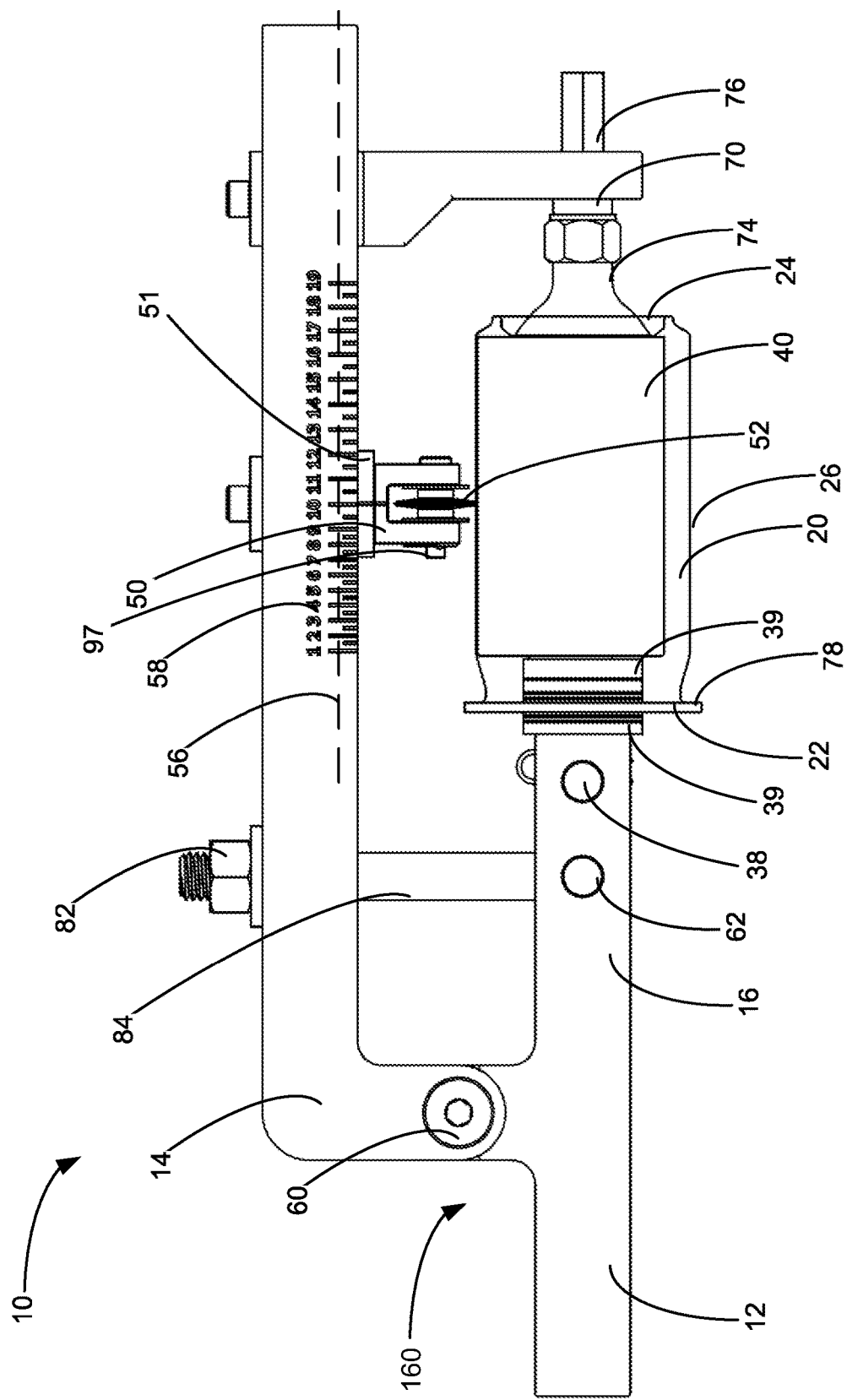
FIG. 2 shows a first side view of the can cutter of FIG. 1.
Figure 3:
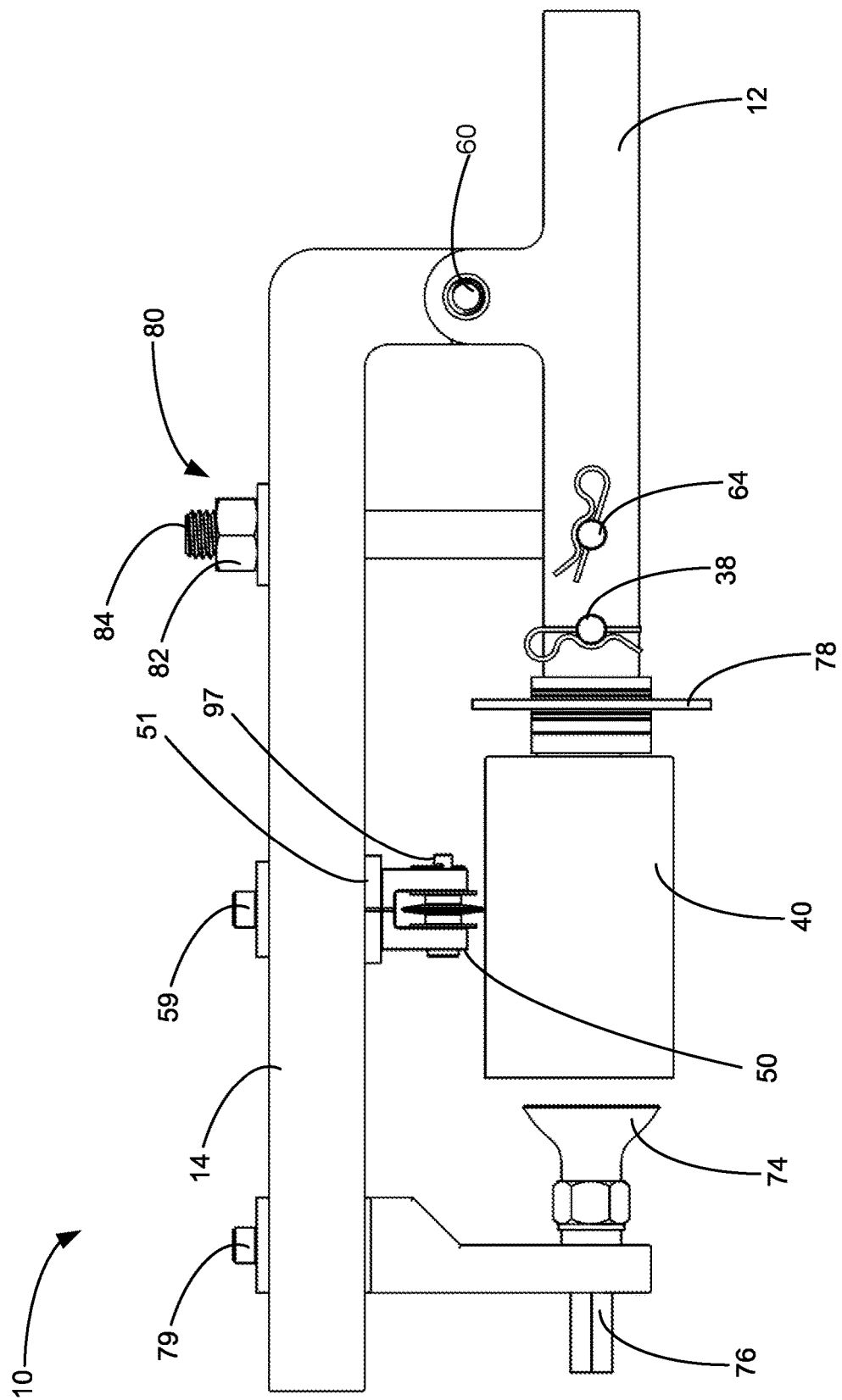
FIG. 3 shows a second side view of the can cutter of FIG. 1 with the can removed.
Figure 4A:
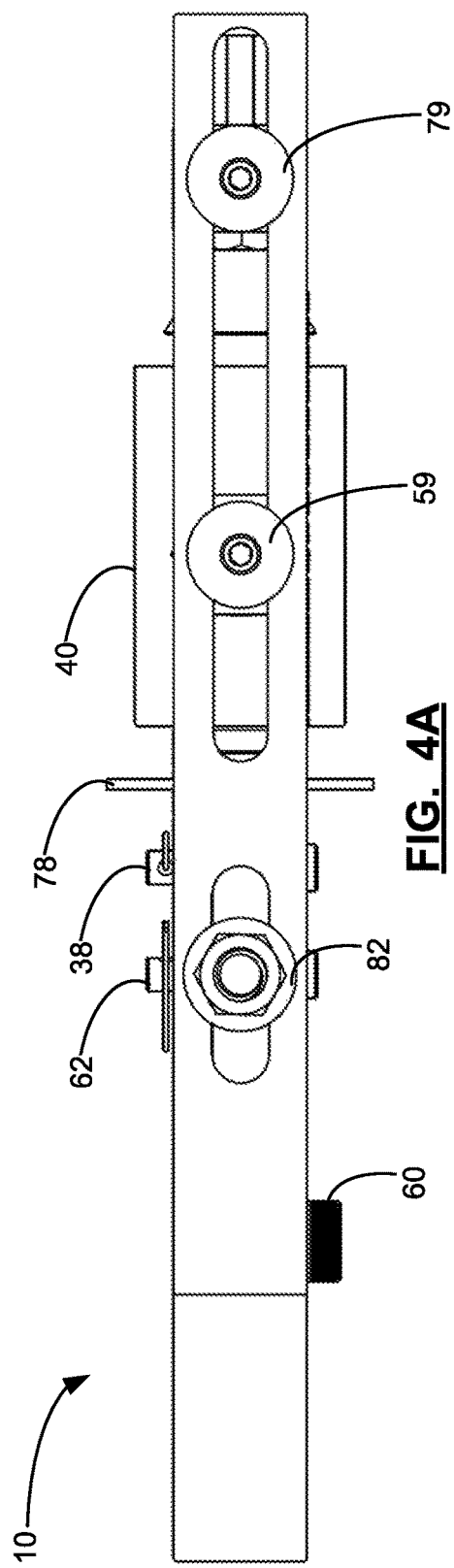
FIGS. 4A and 4B show top and bottom views, respectively, of the can cutter of FIG. 1 with the can removed.
Figure 4B:
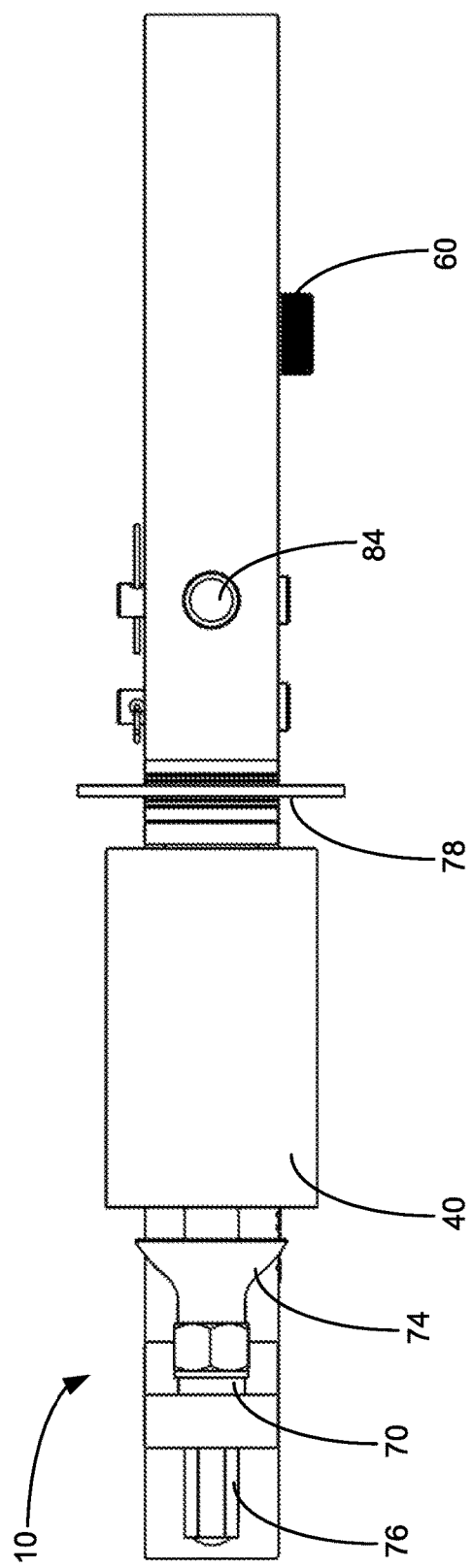

In some embodiments, the cutter 50 may include a removable spacer 51 (see e.g. FIGS. 2-3). The spacer 51 may be used to accommodate differently sized cans 20. For example, the spacer 51 may be used to lower the cutter 50, such that the cutting surface 52 is also lowered. The spacer 51 may also be used as a leveling surface to maintain the cutter 50 perpendicular to the can body 26. Maintaining the cutter 50 perpendicular to the can body 26 may improve the precision of the cutting surface 52 and thereby improve the quality of the cut. Improving the precision of the cutting surface 52 may reduce error in the cutting process by maintaining the cutting surface 52 in the same longitudinal position on the can body 26 as it rotates about the shaft 32. In some embodiments, a plurality of spacers 51 may be used to lower the cutter 50 further. This may accommodate cans having even smaller diameters.

In some embodiments, as exemplified in FIGS. 1-10, the can cutting device 10 may include an adjustment mechanism 160. The adjustment mechanism 160 may allow the can cutting device 10 to be adjusted between a cutting position (see e.g. FIG. 2) and a loading position (see e.g. FIG. 5). When in the loading position, the can 20 may be removably positionable in a mounted position on the mandrel 40, as exemplified by FIG. 6. When the can 20 is mounted to the mandrel 40 and the can cutting device 10 is in the cutting position, the cutting surface 52 may contact the portion of the can body 26 supported by the mandrel 40 at the cutting location 54. The mandrel 40 may provide support for the can body 26 such that the cutting surface 52 applies a pressure at the cutting location 54. Accordingly, when the can is rotated about the can axis of rotation 28, the cutting surface 52 cuts the portion of the can body 26 at the cutting location 54.

For example, as shown in FIGS. 1-10, the adjustment mechanism 106 includes a pivotable mount 60, a spindle adjuster 79, and a cutter adjuster 97. The main body 12 includes a top frame portion 14 and a bottom frame portion 16 coupled to the top frame portion 14. As exemplified, the pivotable mount 60 couples the top frame portion 14 to the bottom frame portion 16. The pivotable mount 60 is operable to rotate the top frame portion 14 to adjust the can cutting device 10 between the cutting position and the loading position. In some embodiments, the bottom frame portion 16 may be secured to a support surface to reduce error when cutting the can 20. For example, during operation, as the can 20 is rotated about the can axis of rotation 28, the rotational force applied to rotate the can 20 may cause the main body 12 to vibrate or translate. This may introduce potential error into the position of the cutting location 54. By securing the bottom frame portion 16, the error in the cut location may be reduced or eliminated. The bottom frame portion 16 may be secured to the support using various fasteners such as, for example, clamps, screws, or any other type of fastener.

It will be appreciated that, for the cutting surface 52 to cut through the can body 26 without damaging the mandrel, the hardness value of the mandrel 40 can be selected to be greater than the hardness value of the cutter 50. For example, the hardness value of the mandrel 40 may be in the range of 53-57 HRC. Alternate hardness values may be used for the mandrel 40 depending on the particular requirements of a can cutting process.

Through continued use, the cutting surface 52 may be worn down by the hardness of the mandrel 40. Accordingly, the cutting surface 52 of the cutter 50 may be replaced with a new cutting surface 52 to ensure a clean cut of the can 20. Alternately or in addition, the cutting surface 52 may be sharpened and returned to the cutter 50 rather than replacing the cutting surface 52.

It will be appreciated that the cutting surface 52 may be any surface capable of cutting the can 20. In some embodiments, the cutting surface 52 may be stationary relative to the cutter 50. For example, the can 20 may be cut by rotating the can 20 about the can axis of rotation 28 such that the stationary cutting surface 52 cuts into the can body 26.

Alternately, the cutting surface 52 may be rotatable or movable. As shown in the example of FIGS. 1-6 and 9-10, the cutting surface 52 may be provided as a cutting wheel. The cutting wheel may be rotatable about a cutting surface axis of rotation 53. The cutting surface 52 may be manually or automatically rotatable about the cutting surface axis of rotation 53. In the exemplified embodiment, the cutting surface 52 may rotate with rotation of the can body 26. In other words, when the cutting surface 52 is in contact with the can 20 and the can 20 is rotated about the can axis of rotation 28, the cutting surface 52 can rotate in an opposite direction to the rotation of the can 20 due to the friction force between the cutting surface 52 and the can body 26. For example, if the can body 26 is rotated in a clockwise direction, the frictional force against the cutting surface 52 may cause the cutting wheel 52 to rotate in a counter-clockwise direction. Depending on the applied force, it will be appreciated that the cutting surface 52 may remain stationary while the can body 26 rotates, using the rotation of the can body 26 to cut the circumference of the can 20.

The mandrel 40 can include a recess 48 for receiving shaft 32. As exemplified in FIG. 8, the recess 48 may include a plurality of varying shapes and/or diameters that correspond to the shape of the shaft 32. In some embodiments, the mandrel 40 may be rotatably mounted to the shaft 32 such that the can 20 and the mandrel 40 are concurrently rotatable. For example, the mandrel 40 may be mounted to the shaft 32 by bearings 49. The bearings 49 may allow the mandrel 40 to rotate about the shaft 32. The recess 48 may also include bearing mounting regions for the bearings 49 to sit within the mandrel 40. When the can 20 is rotated, the pressure at the cutting location 54 caused by the cutter 50 may provide a sufficient friction force between the can 20 and the mandrel 40 to cause the mandrel 40 to rotate with the can 20. Such concurrent rotation may allow a user to apply less force to the can 20 while still causing the can 20 to rotate. Reducing the force required to rotate the can 20 may allow for a smoother and more consistent rotation of the can 20. This may reduce the likelihood of burrs forming along the cut surface.

To reduce stress on the can 20 caused by rotation about the shaft 32 and contact with the cutter 50, the can axis of rotation 28 may be generally aligned with the shaft axis 33. However, as described above, the diameter of the mandrel 40 can be smaller than the diameter of the can 20 to allow for the can 20 to be more easily mounted to the mandrel 40.

The difference in size between the can body 26 diameter and the mandrel 40 diameter can provide offset longitudinal axes of the mandrel 40 and the can 20. Accordingly, to further assist with the cutting process the mandrel 40 can be eccentrically mounted to the shaft 32 as exemplified in FIG. 2.

Eccentrically mounting the mandrel 40 to the shaft 32 allows for a reduced diameter of the mandrel 40 relative to the can body 26, while maintaining the general alignment between the can axis of rotation 28 and the shaft axis 33. This may thereby stress on the can 20 as it is being cut. As described above, reducing the stress on the can 20 may result in a cleaner, more consistent cut surface of the can body 26. In other words, the mandrel axis 41 may be offset from the center of the shaft axis 33 while maintaining the alignment of the can body 26, the shaft 32, and the cutting surface 52.

Figure 7A:
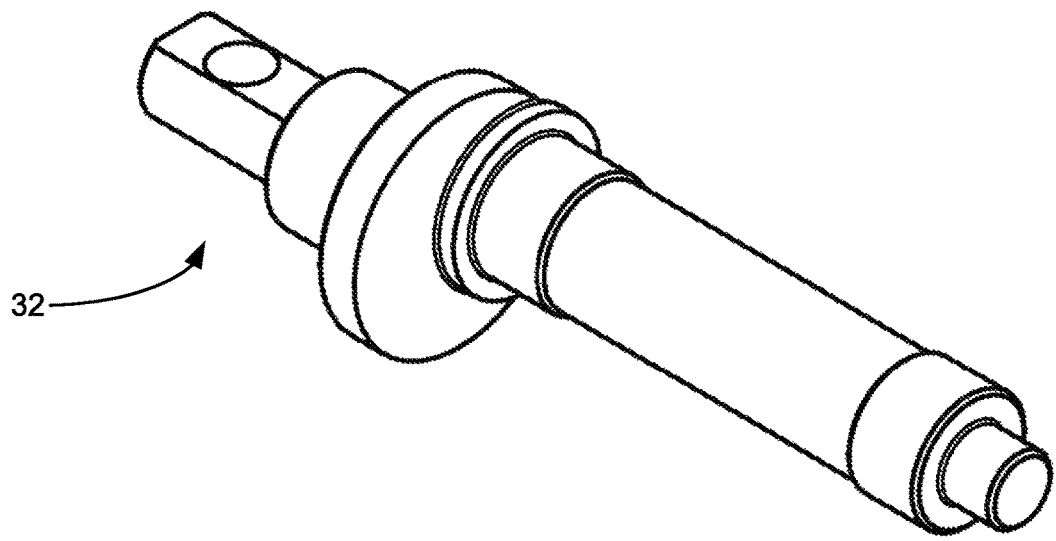
FIG. 7A shows a perspective view of a shaft of the can cutter of FIG. 1.
Figure 7B:
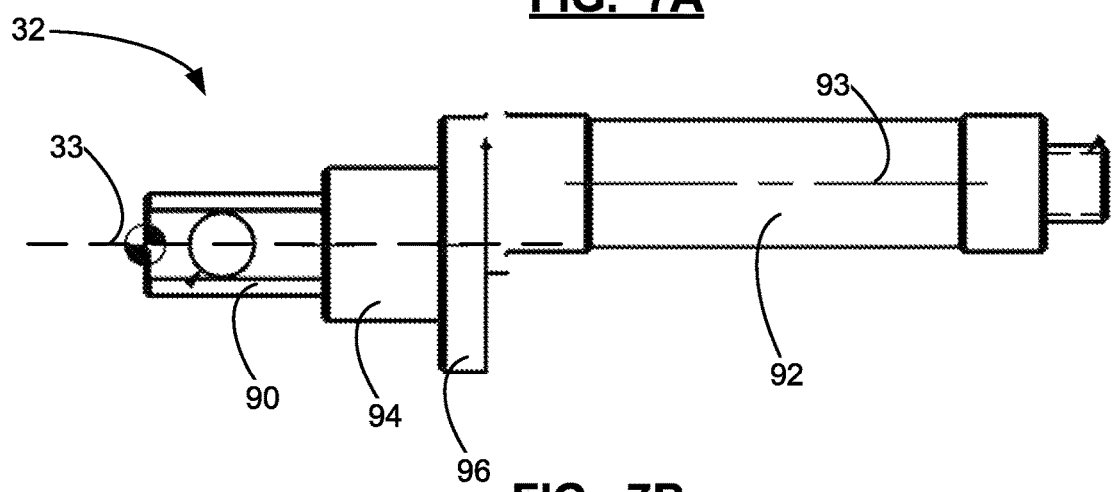
FIGS. 7B and 7C show partial cross-sectional side and top views, respectively, of the shaft of FIG. 7A.
Figure 7C:
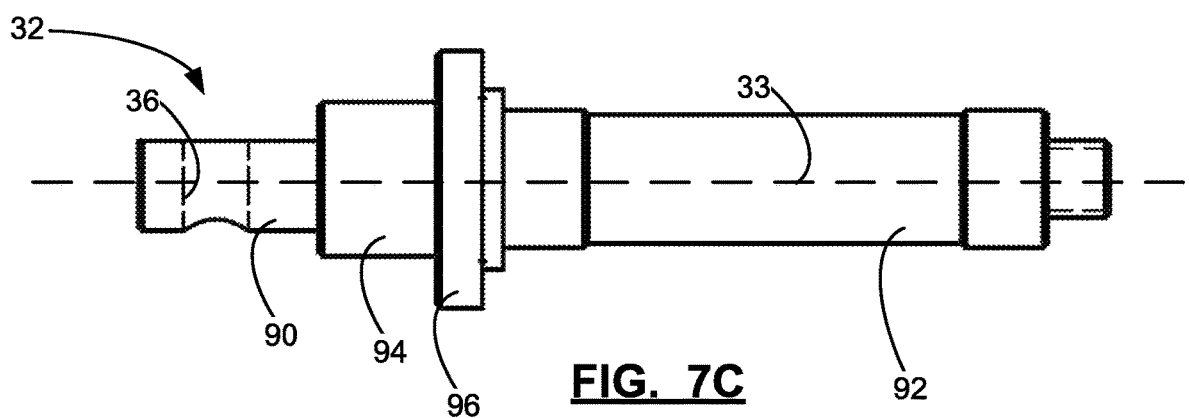

Referring to FIGS. 7A-7C, shown therein is an exemplary embodiment of the shaft 32. To more clearly show the eccentricity of the position of the mandrel 40 on the shaft 32, the mandrel 40 is omitted from FIGS. 7A-7C. As exemplified, the shaft 32 has a first portion 90 and a second portion 92. The first portion 90 may be coupled to the main body 12, while the second portion may be used to support the mandrel 40. As shown in FIGS. 7A-7C, the second portion 92 of the shaft 32 has a second shaft axis 93 that is offset from the shaft axis 33. In other words, the second portion 92 is eccentrically positioned relative to the shaft axis 33.

As exemplified, the first portion 90 of the shaft 32 has a guide plate support 94. Guide plate support can be used to support a guide plate 78. The guide plate 78 is shown in FIGS. 1-6 and 9-10 and will be discussed in more detail herein below. The shaft 32 may also have a guide plate seat 96 to prevent the guide plate 78 from moving from the first portion 90 to the second portion 92. The guide plate 78 may be used to support the open end 22 of the can 20, as exemplified in FIG. 2. Accordingly, the can body 26 may be positioned on the mandrel 40 with the can axis of rotation 28 generally aligned with the shaft axis 33, while eccentrically positioning the mandrel 40 on the second portion 92 of the shaft 32. Thus, the mandrel 40 may be sized to have a smaller diameter than the can body 26 to allow for both an easier mounting of the can 20 and rotation about the can axis of rotation 28, without interfering with the mandrel 40.

During use, the can 20 may be easily mounted onto the mandrel 40, as shown in FIG. 2. The can 20 is supported by the mandrel 40 at the cutting location 54, while leaving a gap between the can body 26 and the mandrel 40 at the lower side of the mandrel 40. As the can 20 rotates about the can axis of rotation 28, the guide plate 78 supports the open end 22 while maintaining the cutting location 54 at a consistent elevation and distance from the guide plate 78. The guide plate 78 may also help to maintain the can axis of rotation 28 in proper alignment with the shaft axis 33. As described above, the mandrel 40 may also rotate about the shaft 32. Due to the difference in diameters between the can 20 and the mandrel 40, relative rotation between the mandrel 40 and the can 20 may not interfere with the cutting process. It will be appreciated that the mandrel 40 and the can 20 may rotate together or separately, at the same or different speeds, depending on the applied force of rotation by the user and the pressure of the cutter 50, as well as friction between the mandrel 40 and the can 20. In other words, the mandrel 40 and the can 20 may rotate at different frequencies while still allowing the mandrel 40 to support the can 20 at the cutting location 54, and also while allowing for easy loading and removal of the can 20 from the mandrel 40.

In some embodiments, as described above, the cutting device 10 may include the guide plate 78 rotatably mounted to the shaft 32. As exemplified, the guide plate 78 is mounted to the guide plate support 94 on the first portion 90 of the shaft 32. When the cutting device 10 is in the cutting position, the guide plate 78 may support the open end 22 of the can 20, such that rotation of the can 20 drives rotation of the guide plate 78 about the can axis of rotation 28. As exemplified, the guide plate 78 can be mounted between thrust bearings 39 rotatably coupled to the shaft 32. The thrust bearings 39 allow the guide plate 78 to rotate about the shaft 32. Similar to the rotation of mandrel 40, the rotation of the guide plate 78 may improve the quality of the can cut. The mandrel 40 can support the can 20 at the cutting location 54, while the guide plate 78 supports the open end 22 of the can 20. The additional support at the open end 22 may reduce the force required to cause the can 20 to rotate, thereby reducing friction and error.

In some embodiments, the guide plate 78 may include a circular groove (not shown) to receive the open end 22 of the can 20. The groove may improve the contact between the can body 26 and the guide plate 78. This may further error during the can cutting process. For example, as the cutter 50 cuts the can 20 at the cutting location 54, the pressure of the cutting surface 52 may cause the can 20 to slightly leave the surface of the mandrel 40 distal to the cutting location 54. The circular grooves in the guide plate 78 may secure the open end 22 of the can 20 in place, thereby preventing the can 20 from leaving the mandrel 40. Similar to the mandrel 40 and the shaft 32, the guide plate 78 may be replaced depending on the can size. For example, the guide plate 78 may be replaced with a thicker guide plate 78 for different can sizes.

Figure 5:
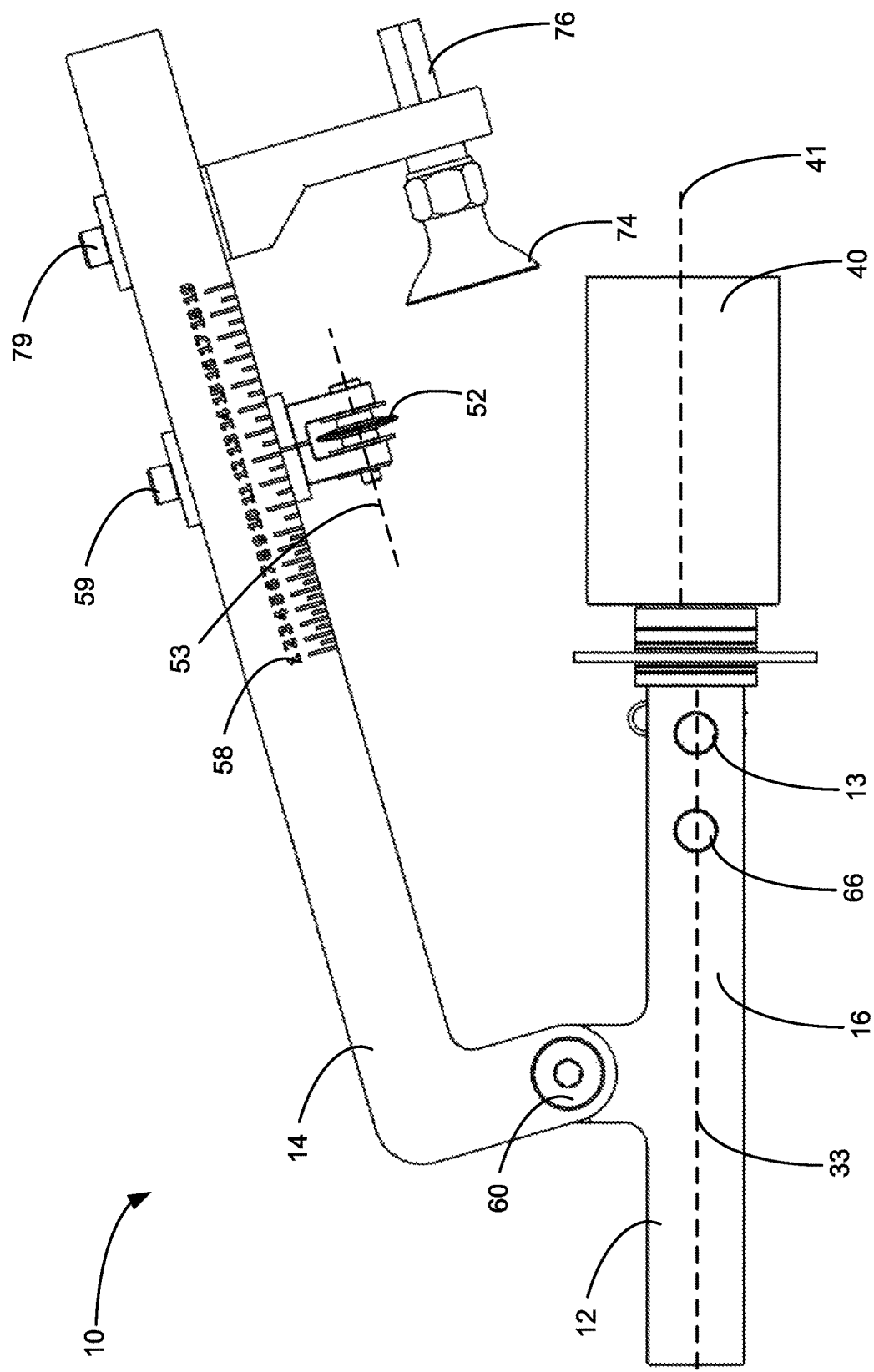
FIG. 5 shows a side view of the can cutter of FIG. 1 in a loading position.

As shown in FIG. 5, the shaft axis 33 and the mandrel axis 41 may be parallel. Positioning the mandrel axis 41 parallel with the shaft axis 33 may improve the cut of the can 20 by improving the consistency of the contact between the cutter 50 and the can 20. Since the can 20 rests on the mandrel 40, the angle of the can body 26 at the cutting location 54 relative to the shaft axis 33 can be generally the same as the angle of the mandrel 40 relative to the shaft axis 33. Accordingly, when the mandrel axis 41 is parallel to the shaft axis 33, the can axis of rotation 28 is generally parallel with the mandrel axis 41 and the shaft axis 33. As the can body 26 rotates about the can axis of rotation 28, the parallel mandrel axis 41 and shaft axis 33 can provide a consistent cutting distance and pressure from the cutter 50 on the can body 26. In other words, positioning the mandrel axis 41 parallel to the shaft axis 33 may help to maintain the cutter 50 in a perpendicular orientation relative to the can body 26. As described above, having a perpendicular cutting surface 52 relative to the can body 26 may improve the quality of the cut.

Additionally, having the mandrel axis 41 parallel to the shaft axis 33 may increase the ease of use of the cutting device 10. Parallel axes may reduce the friction between the mandrel 40 and the shaft 32, thereby allowing a user to more easily apply a force to rotate the mandrel 40 about the shaft 32. As described above, reduction in friction may also improve the quality of the cut of the can 20 by reducing the likelihood of discontinuous applied force to the rotation of the can body 26. In other words, a user may more easily rotate the can 20 about the shaft 32 without the friction of the mandrel 40 causing the can 20 to move from its longitudinal position relative to the cutting surface 52.

In some embodiments, as exemplified in FIGS. 1-10, the can cutting device 10 may have a spindle 70 rotatably coupled to the main body 12. The spindle 70 is rotatable about a spindle axis of rotation 72. The spindle 70 may have an attachment member 74 coupled to the spindle 70. The attachment member 74 may be engageable with the can 20. The spindle 70 may also have a spindle drive 76 coupled to the spindle 70. The spindle drive 76 may be operable to drive rotation of the spindle 70. In some embodiments, the spindle drive 76 may be a manually actuated drive member. As exemplified, the spindle drive 76 is faceted to provide grip for a user to rotate the spindle drive 76. For example, the spindle drive 76 may be, or include, a crank. Alternately or in addition, the spindle drive 76 may include an automatically actuated drive member. For example, the spindle drive 76 may include a motor coupled to the spindle by a belt such that when the motor is operation, the belt rotates to rotate the spindle 70.

It will be appreciated that the attachment member 74 may be any member capable of drivingly engaging the spindle 70 with the can body 26. When the can 20 is mounted to the mandrel 40 and the cutting device 10 is in the cutting position, the attachment member 74 may be drivingly engaged with the can 20 such that rotation of the spindle 70 drives rotation of the can body 26. As described above, when the can body 26 is rotated, the cutting surface 52 cuts the can 20 at the cutting location 54. For example, the attachment member 74 may include a vacuum cup. The vacuum cup can be configured to use suction to secure the spindle 70 to the can body 26.

Alternately or in addition, the attachment member 74 may include a magnet that provides a magnetic force between the mandrel 40 and the attachment member 74. This may ensure that the base end 24 of the can 20 is pinched between the mandrel 40 and the attachment member 74. The magnetic force may allow for the can 20 to rotate with rotation of the attachment member 74.

Alternately or in addition, the attachment member 74 may include an adhesive. The adhesive may be used to adhere the spindle 70 to the can 20 such that rotation of the spindle 70 drives rotation of the can 20.

Alternately or in addition, the attachment member 74 may include a mating can engagement member. The can engagement member may be shaped to fit within the base end 24 of the can 20. A tight fit, such as a location fit or a transition fit, between the attachment member 74 and the can 20 may allow the attachment member 74 to drive the rotation of the can 20 as the spindle 70 is rotated, while also allowing the user to remove the attachment member 74 once the cut is complete.

In some examples, the attachment member 74 includes a biasing member (not shown) to bias the can body 26 against the guide plate 78. It will be appreciated that the biasing member may bias the can body 26 against the guide plate 78 by any means. For example, the biasing member may be a spring. The biasing member may bias the can body 26 against the guide plate 78 with sufficient pressure to maintain the cutting location 54 at a constant distance from the guide plate 78 as the can 20 is rotated about the can axis of rotation 28. In other words, the guide plate 78 may provide support to the can 20, thereby preventing the can body 26 from being damaged or unintentionally moved during the cutting process. It will be appreciated that the specific pressure provided by the biasing member may be selected depending on the requirements of a particular application. In some examples, the pressure provided by the biasing member to bias the can body 26 against the guide plate 78 may be less than 4 lbs. In some examples, the pressure provided by the biasing member to bias the can body 26 against the guide plate 78 may be less than 2 lbs.

In some embodiments, the adjustment mechanism 160 may include at least one adjustable component of the main body 12. For example, the cutter 50 may be adjustable between a cutter engaged position and a cutter disengaged position. In some embodiments, the cutter 50 may be rotatably mounted to the main body 12 such that the cutter 50 is movable between the cutter engaged position and the cutter disengaged position.

In some embodiments, the spindle 70 may be adjustable between a spindle engaged position and a spindle disengaged position. Accordingly, the adjustment mechanism 160 may include one or more of a cutter adjuster 97 to adjust the cutter between the cutter engaged position and the cutter disengaged position and a spindle adjuster 79 to adjust the spindle between the spindle engaged position and the spindle disengaged position. During operation, when the cutting device 10 is in the cutting position, the adjustable cutter 50 is positioned in the cutter engaged position and the adjustable spindle 70 is in the spindle engaged position such that the cutter 50 and the spindle 70 are both in contact with the can 20. When the cutting device 10 is in the loading position, the adjustable cutter 50 is in the cutter disengaged position and the adjustable spindle 70 is in the spindle disengaged position such that the cutter 50 and the spindle 70 are both disengaged from the can 20, thereby facilitating the removal of the can 20 from the mandrel 40, or the loading of the can 20 onto the mandrel 40.

In some embodiments, the can cutting device 10 may include a pressure adjuster 80. The pressure adjuster 80 may be operable to adjust a pressure of the cutting surface 52 against the can body 26. As exemplified in FIGS. 1-4 and 9-10, the pressure adjuster 80 may include a fastener 82 and a rod 84. The fastener 82 and the rod 84 are each threaded with corresponding threads. During operation, a user may rotate the fastener 82, thereby causing the fastener 82 to move downwardly along the rod 84. As the fastener 82 moves down the rod 84, the fastener 82 applies increasing pressure to the top frame portion 14 of the main body 12.

The pressure adjuster 80 may allow a user to gradually increase the pressure on the can 20. This may allow a user to provide a highly controlled cut to the can 20 while minimizing excess pressure on can 20.

For example, when in the cutting position, a user may rotate the can 20 by rotating the spindle drive 76. As the can 20 rotates, the cutter 50 begins to cut, or score, the can body 26 at the cutting location 54 with the cutting surface 52. Once the can 20 has completed a full rotation, the user may increase the pressure by rotating the fastener 82. Rotating the fastener 82 increases the pressure on the top frame portion 14, which causes the top frame portion 14 to move slightly downwards. Moving the top frame portion 14 downwards causes the cutter 50 to move downwards, thereby increasing the pressure of the cutter 50 on the can 20. A user may repeat this process at various increasing pressures until the can 20 is cut through its entire thickness.

It will be appreciated that the pressure applied to the can body 26 may vary depending on the can material and the user operating the cutting device 10. It will also be appreciated that a pressure adjuster 80 may also be used in conjunction with an automated drive member for the spindle drive 76.

It will also be appreciated that a user need not wait until the can 20 has completed a full rotation before increasing the pressure on the can body 26. For example, a user may continuously increase the pressure at gradual increments as the can body 26 is rotated by the spindle 70. In some embodiments, the pressure of the cutting surface 52 against the can body 26 may be less than 10 lbs. In some embodiments, the pressure of the cutting surface 52 against the can body 26 may be less than 5 lbs.

In some embodiments, the can cutting device 10 may have an adjustment lock 62 movable between a locked position and an unlocked position. When the adjustment lock 62 is in the locked position, the a pivotable mount 60 is fixed to secure the can cutting device in one of the loading position and the cutting position. When the adjustment lock 62 is in the unlocked position, the pivotable mount 60 may be operable to adjust the can cutting device 10 between the cutting position and the loading position. As exemplified, the adjustment lock 62 may include a pin 64 receivable in an aperture 66, located within the bottom frame portion 16. The rod 84 of the pressure adjuster 80 includes a rod aperture (not shown) for receiving the pin 64. To lock the cutting device 10, a user may insert the pin 64 through the rod aperture, into the aperture 66. The pressure adjuster rod 84 then acts to secure the top frame portion 14 and the bottom frame portion 16 in the locked position. To unlock the cutting device 10, a user may remove the pin 64 from the aperture 66 and from the rod aperture.

The following is an example process for cutting a can 20 using the can cutting device 10. A user may move the cutting device from the cutting position to the loading position, as shown in FIG. 5. In some embodiments, this step may involve moving the adjustment lock 62 to the unlocked position. A user may then mount the can 20 onto the mandrel 40 by sliding the open end 22 of the can 20 onto the mandrel 40, as shown in FIG. 6. In some embodiments, the can 20 may be moved along the mandrel 40 until the open end 22 contacts the guide plate 78. Once the can 20 is mounted on the mandrel 40, the cutting device 10 may be moved from the loading position to the cutting position, as shown in FIG. 2. In some embodiments, moving the cutting device 10 from the loading position to the cutting position may involve rotating the top frame portion 14 downwardly and locking the adjustment lock 62. The spindle 70 may then be adjusted to move the attachment member 74 into contact with the base end 24 of the can 20. In some embodiments, the attachment member 74 may bias, or having a biasing member that biases the can 20 against the guide plate 78 to improve the stability of the can 20.

Once the can 20 is mounted and secured in place, in some embodiments, the user may adjust the cutting length by using the cutter lock 59 and the length guide 58. The user may unlock the cutter lock 59 and position the cutter 50 at the desired cutting length. Once the cutter 50 is at the desired cutting length, the user may adjust the pressure using the pressure adjuster 80 to increase the pressure on the top frame portion 14, thereby causing the cutting surface 52 of the cutter 50 to contact the can body 26 at the cutting location 54. The user may then begin to drive rotation of the can 20 by rotating the spindle drive 76. As the can 20 rotates, the user may increase the pressure on the can 20 using the pressure adjuster 80 to increase the depth of the cut at the cutting location 54. The user may repeat this process as many times as required, incrementally increasing the pressure on the can 20 by rotating the fastener 82 until the can 20 is circumferentially cut all the way through its thickness.

Once the can 20 has been cut through, the user may reduce the pressure by rotating the fastener 82 in the opposite direction to allow the cutter 50 to move away from the can body 26. The user may then decouple the attachment member 74 from the base end 24 and unlock the adjustment lock 62. The top frame portion 14 may be lifted, and the can 20 may be unmounted from the mandrel 40.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

We claim:

1. A can cutting device for a can having an open end, a base end, and a can body extending between the open end and the base end, the can cutting device comprising:
    a main body;
    a can support assembly coupled to the main body, the can support assembly having a shaft that extends along a longitudinal shaft axis and a mandrel that extends along a longitudinal mandrel axis parallel to the longitudinal shaft axis, wherein the mandrel is eccentrically mounted to the shaft;
    a spindle rotatably coupled to the main body, the spindle being rotatable about a spindle axis of rotation, the spindle being adjustable between a spindle engaged position and a spindle disengaged position;
    a cutter coupled to the main body, the cutter having a cutting surface, the cutter being adjustable between a cutter engaged position and a cutter disengaged position; and
    an adjustment mechanism usable to adjust the can cutting device between a cutting position and a loading position, the adjustment mechanism comprising a pivotable mount between a top frame portion and a bottom frame portion of the main body, wherein the pivotable mount is operable to rotate the top frame portion to adjust the can cutting device between the cutting position and the loading position, a cutter adjuster operable to adjust the cutter between the cutter engaged position and the cutter disengaged position and a spindle adjuster operable to adjust the spindle between the spindle engaged position and the spindle disengaged position,
    wherein:
        the can is positionable in a mounted position on the mandrel with the can mounted in a position that holds the can body in contact with the mandrel at least at a cutting location,
        when the can cutting device is in the loading position, the cutter is in the cutter disengaged position and the spindle is in the spindle disengaged position such that the cutter and spindle are both disengaged from the can thereby facilitating removal of the can from the mandrel,
        when the can cutting device is in the cutting position:
            the cutter is positioned in the cutter engaged position and the spindle is in the spindle engaged position such that the cutter and spindle are both in contact with the can,
            the can is rotatable about a can axis of rotation,
            the cutting surface contacts the portion of the can body supported by the mandrel at the cutting location, and
            when the cutting surface is in contact with the portion of the can body supported by the mandrel at the cutting location and the can is rotated about the can axis of rotation, the cutting surface cuts the portion of the can body at the cutting location.

2. The can cutting device of claim 1, wherein when the can cutting device is in the loading position, the can is removably positionable in the mounted position on the mandrel.

3. The can cutting device of claim 1, further comprising:
    an attachment member coupled to the spindle, the attachment member is engageable with the can; and
    a spindle drive coupled to the spindle, the spindle drive is operable to drive rotation of the spindle.

4. The can cutting device of claim 3, wherein when cutting device is in the cutting position and the can is positioned in the mounted position the attachment member is drivingly engaged with the can such that rotation of the spindle drives rotation of the can body.

5. The can cutting device of claim 3, wherein the attachment member comprises a vacuum cup.

6. The can cutting device of claim 3, wherein the spindle drive comprises a manually actuated drive member.

7. The can cutting device of claim 1, wherein the mandrel is rotatably mounted to the shaft such that the can and the mandrel are concurrently rotatable.

8. The can cutting device of claim 1, further comprising a pressure adjuster, the pressure adjuster operable to adjust a pressure of the cutting surface against the can body.

9. The can cutting device of claim 1, wherein a pressure of the cutting surface against the can body is less than 5 lbs.

10. The can cutting device of claim 1, further comprising an adjustment lock movable between a locked position and an unlocked position, wherein when the adjustment lock is in the locked position the adjustment mechanism is fixed to secure the can cutting device in one of the loading position and the cutting position and when the adjustment lock is in the unlocked position the adjustment mechanism is operable to adjust the can cutting device between the cutting position and the loading position.

11. The can cutting device of claim 1, further comprising a guide plate rotatably mounted to the shaft and a thrust bearing on either side of the guide plate, wherein when the can cutting device is in the cutting position the guide plate supports the open end of the can whereby rotation of the can drives rotation of the guide plate about the can axis of rotation.

12. The can cutting device of claim 11, further comprising a biasing member to bias the can body against the guide plate.

13. The can cutting device of claim 12, wherein the biasing member biases the can body against the guide plate with a pressure such that as the can is rotated about the can axis of rotation the cutting location remains at a constant distance from the guide plate.

14. The can cutting device of claim 13, wherein the pressure provided by the biasing member to bias the can body against the guide plate is less than 2 lbs.

15. The can cutting device of claim 1, wherein the cutter is movable along a cutter axis parallel to the mandrel longitudinal axis whereby the cutting location is adjustable.

16. The can cutting device of claim 15, further comprising a length guide along the cutter axis.

17. The can cutting device of claim 1, wherein at least one of the shaft and the mandrel is removable.

18. The can cutting device of claim 1, further comprising a shaft adaptor coupled to the main body, wherein the shaft adaptor removably couples the shaft to the main body.

19. The can cutting device of claim 1, wherein the mandrel has a mandrel hardness value greater than a cutter hardness value of the cutter.

20. The can cutting device of claim 19, wherein the mandrel hardness value is in the range of 53-57 HRC.

21. A can cutting device for a can having an open end, a base end, and a can body extending between the open end and the base end, the can cutting device comprising:
 a main body;
 a can support assembly coupled to the main body, the can support assembly having a shaft that extends along a longitudinal shaft axis and a mandrel that extends along a longitudinal mandrel axis parallel to the longitudinal shaft axis, wherein the mandrel is eccentrically mounted to the shaft;
 a cutter coupled to the main body, the cutter having a cutting surface;
 a spindle rotatably coupled to the main body, wherein the spindle is rotatable about a spindle axis of rotation, and the spindle has an attachment member;
 a spindle drive coupled to the spindle, the spindle drive operable to drive rotation of the spindle;
 an adjustment mechanism to adjust the can cutting device between a cutting position and a loading position, the adjustment mechanism comprising a pivotable mount between top frame portion and a bottom frame portion of the main body, wherein the pivotable mount is operable to rotate the top frame portion to adjust the can cutting device between the cutting position and the loading position, a cutter adjuster operable to adjust the cutter between a cutter engaged position and a cutter disengaged position, and a spindle adjuster operable to adjust the spindle between a spindle engaged position and a spindle disengaged position,
 wherein when the can cutting device is in the cutting position:
  the cutter is positioned in the cutter engaged position and the spindle is in the spindle engaged position such that the cutter and spindle are both in contact with the can,
  the can is in a mounted position on the mandrel with the can mounted to the mandrel with at least a portion of the can body supported by the mandrel,
  the can is rotatable about a can axis of rotation,
  the cutting surface is positioned to contact the portion of the can body supported by the mandrel at a cutting location,
  the can axis of rotation and the spindle axis of rotation are aligned, and
  the attachment member is drivingly engaged with the can such that rotation of the spindle drives rotation of the can body whereby the cutting surface cuts the portion of the can body at the cutting location, and
 wherein when the can cutting device is in the loading position:
  the cutter is in the cutter disengaged position and the spindle is in the spindle disengaged position such that the cutter and spindle are both disengaged from the can thereby facilitating removal of the can from the mandrel.

22. A can cutting device for a can having an open end, a base end, and a can body extending between the open end and the base end, the can cutting device comprising:
 a main body;
 a can support assembly coupled to the main body, the can support assembly having a shaft that extends along a longitudinal shaft axis and a mandrel that extends along a longitudinal mandrel axis parallel to the longitudinal shaft axis, wherein the mandrel is eccentrically mounted to the shaft;
 a spindle rotatably coupled to the main body, the spindle being rotatable about a spindle axis of rotation;
 a cutter coupled to the main body, the cutter having a cutting surface; and
 an adjustment mechanism usable to adjust the can cutting device between a cutting position and a loading position, the adjustment mechanism comprising a pivotable mount between a top frame portion and a bottom frame portion of the main body, wherein the pivotable mount is operable to rotate the top frame portion away from the bottom frame portion to adjust the can cutting device between the cutting position and the loading position,
 wherein:
  the can is positionable in a mounted position on the mandrel with the can mounted in a position that holds the can body in contact with the mandrel at least at a cutting location,
  when the can cutting device is in the loading position, the cutter and spindle are both disengaged from the can thereby facilitating removal of the can from the mandrel,
  when the can cutting device is in the cutting position:
   the cutter and the spindle are both in contact with the can,
   the can is rotatable about a can axis of rotation,
   the cutting surface contacts the portion of the can body supported by the mandrel at the cutting location, and
  when the cutting surface is in contact with the portion of the can body supported by the mandrel at the cutting location and the can is rotated about the can axis of rotation, the cutting surface cuts the portion of the can body at the cutting location.

23. The can cutting device of claim 21, wherein:
 the spindle is adjustable between a spindle engaged position and a spindle disengaged position and the cutter is adjustable between a cutter engaged position and a cutter disengaged position; and
 the adjustable mechanism further comprises a cutter adjuster operable to adjust the cutter between the cutter engaged position and the cutter disengaged position and a spindle adjuster operable to adjust the spindle between the spindle engaged position and the spindle disengaged position.

* * * * *